US008018794B2

(12) United States Patent
Thierry

(10) Patent No.: US 8,018,794 B2
(45) Date of Patent: Sep. 13, 2011

(54) INDEPENDENT DEVICE FOR DETERMINING ABSOLUTE GEOGRAPHIC COORDINATES OF AN IMMERSED MOVING BODY

(75) Inventor: Brizard Thierry, Ollainville (FR)

(73) Assignee: Thales (FR)

( * ) Notice: Subject to any disclaimer, the term of this patent is extended or adjusted under 35 U.S.C. 154(b) by 255 days.

(21) Appl. No.: 11/722,646

(22) PCT Filed: Dec. 12, 2005

(86) PCT No.: PCT/EP2005/056671
§ 371 (c)(1),
(2), (4) Date: Apr. 11, 2008

(87) PCT Pub. No.: WO2006/067058
PCT Pub. Date: Jun. 29, 2006

(65) Prior Publication Data
US 2008/0291084 A1 Nov. 27, 2008

(30) Foreign Application Priority Data
Dec. 23, 2004 (FR) ..................... 04 13835

(51) Int. Cl.
*G01S 3/80* (2006.01)
*G01S 5/18* (2006.01)
(52) U.S. Cl. ................ 367/120; 367/131; 367/910
(58) Field of Classification Search .......... 367/120, 367/131, 910
See application file for complete search history.

(56) References Cited

U.S. PATENT DOCUMENTS

| 5,119,341 | A | * | 6/1992 | Youngberg | 367/5 |
| 5,331,602 | A | * | 7/1994 | McLaren | 367/6 |
| 6,272,072 | B1 | * | 8/2001 | Wulich et al. | 367/124 |
| 6,762,678 | B2 | * | 7/2004 | Arens | 367/131 |
| 6,941,226 | B2 | * | 9/2005 | Estep | 701/213 |
| 2004/0068371 | A1 | | 4/2004 | Estep | |

FOREIGN PATENT DOCUMENTS

| JP | 2003215230 | 7/2003 |
| JP | 2003215230 | 11/2003 |
| WO | 0210793 | 2/2002 |

* cited by examiner

*Primary Examiner* — Ian J Lobo
(74) *Attorney, Agent, or Firm* — Lowe Hauptman Ham & Berner, LLP

(57) ABSTRACT

This invention relates to immersed moving bodies for which the activity requires knowledge of their absolute geographic coordinates. This is the case particularly for moving bodies performing site survey operations, excavations and more generally exploration operations. A moving body can equally well refer to an independent diver, a manned vehicle or an unmanned machine. The device is used by an immersed moving body for independent determination of its absolute geographic coordinates. The device, according to the invention comprises on board calculation means (31) associated with "surface" position means (32) consisting of a GPS or GALILEO type receiver, submarine positioning means (33) operating on the principle of homing in association with immersed fixed acoustic beacon (41) and a set of sensors (36) that the moving body (42) uses to determine its working depth, its horizontality, and the difference between the direction followed and a fixed direction, for example magnetic north. All acquired data are used by the calculation means to determine the absolute geographic position and the operating depth of the moving body (42) at any time, particularly when the body is immersed.

10 Claims, 4 Drawing Sheets

INDEPENDENT DEVICE FOR DETERMINING ABSOLUTE GEOGRAPHIC COORDINATES OF AN IMMERSED MOVING BODY

CROSS-REFERENCE TO RELATED APPLICATIONS

The present Application is based on International Application No. PCT/EP2005/056671, filed on Dec. 12, 2005, which in turn corresponds to French Application No. 0413835 filed on Dec. 23, 2004, and priority is hereby claimed under 35 USC §119 based on these applications. Each of these applications are hereby incorporated by reference in their entirety into the present application.

FIELD OF THE INVENTION

This invention is applicable to immersed moving bodies, for which the activity requires that their absolute geographic position (longitude, latitude, altitude) is known. This is the case particularly for moving bodies performing site survey operations, excavations or more generally exploration operations. A moving body refers to an independent diver, or an inhabited vehicle or an automated machine.

BACKGROUND OF THE INVENTION

"Surface" positioning systems to determine absolute coordinates (longitude, latitude, altitude) at any point on the earth's surface or in its atmosphere are already available on the market. The latest generation systems offer positioning by a network of satellites in geostationary orbits emitting hyper frequency signals. A moving body on the surface or in the earth's atmosphere and equipped with appropriate device can decode said signals and extract its own absolute coordinates, for example in longitude, latitude and altitude, from them. For example, these positioning systems include the American Global Positioning System (GPS) and the future European Galileo system.

All systems marketed at the moment provide the possibility of determining an absolute geographic position with sufficient precision for most purposes, for the purchase of an inexpensive and compact device.

On the other hand, since the operating principle of these systems is based on the use of microwaves, they cannot be used for immersed moving bodies at a depth of more than one meter.

Independently of "surface" positioning systems described above, the market offers positioning systems enabling an immersed moving body to determine its position relative to a given point, usually marked by a beacon. These systems use acoustic wave propagation and operate on the basis of the known "homing" principle. According to this principle illustrated in FIG. 1, each moving body (divers in this illustration) is equipped with a device that can be used at any time to determine the distance D separating it from the beacon and the bearing θ in which said beacon is located with respect to its velocity vector. For example, the beacon may be immersed from a boat that then forms a fixed point coincident with the location from which the moving body started.

The most efficient devices that can be used by immersed moving bodies are provided with an omni-directional acoustic antenna to determine the bearing θ of an incident acoustic wave at any time. Such a device developed for pleasure diving is described particularly in international patent PCT/IB01/01361 deposited by the XIOS S.A. company and published under reference WO 02/10793.

With a positioning system operating according to the "homing" principle, a moving body only knows its position relative to the beacon, and when said moving body movesalong both of the 3 axes of space, the distance D and bearing θ information provided by the device is inherently ambiguous: all they permit is to position the moving body on a sphere of diameter D centred on the beacon, as shown on FIG. 2.

Therefore, these "homing" positioning systems do not satisfy the need that an immersed moving body may have to determine its absolute geographic position, for example during submarine exploration missions, or archaeological excavations or prospecting campaigns.

A device compatible firstly with a GPS type "surface" positioning system and secondly a "homing" positioning system as described above that could be envisaged to satisfy this need, could operate as follows:

Before the immersion of the moving body, the device could determine absolute geographic position of the beacon that materialises the start point of the immersion of said moving body, for example using GPS, and memorising said position.

During the immersion, the device could determine the absolute geographic position of the moving body by combining the memorised position of the start point with the relative position of said moving body with respect to the beacon, supplied permanently by the positioning system by "homing".

However, this determination will be affected by the spherical ambiguity caused by positioning by "homing".

One solution to satisfy the same need for an immersed moving body to determine its absolute geographic position, would be for said moving body to estimate its depth, to rise to the surface along a perfectly vertical rising path and then determining its absolute geographic position at the point on the surface, for example using GPS information. Apart from its tedious nature, this type of solution, which in any case is not very useful if the moving body is a diver, is only possible if said moving body can control its drift as it rises to the surface. Otherwise, the measurement made will still comprise an uncertainty.

SUMMARY OF THE INVENTION

In order to satisfy this need, the invention proposes a device enabling an immersed moving body to calculate independently the absolute geographic position (longitude, latitude and altitude) of the point at which it is located.

To achieve this, device according to the invention associates:
"Surface" means,
"Homing" submarine positioning means,
Calculation means,
Means of knowledge of the environment of the moving body, which are in particular necessary to eliminate the spherical ambiguity inherent to submarine positioning means by "homing".

According to the invention, these means cooperate to provide onboard calculation means (31) with the information necessary to calculate changes in latitude, longitude and depth with respect to an origin position for which the absolute geographic coordinates are known.

In one preferred embodiment described as an example, the means of knowledge of the moving body environment comprise at least three sensors in order to provide:

Fixed direction in space,

Inclination of the immersed moving body from a horizontal plane,

Immersion depth of the moving body,

These three sensors could advantageously be complemented by a temperature sensor and a salinity sensor of the environment in which the moving body is immersed.

The device according to the invention has the advantage that the immersed moving body can use it to determine its own absolute geographic position.

Apart from a simple acoustic beacon, for example purchased in the shops and marking the immersion start point of the moving body, the device according to the invention does not require the deployment of any owncommunication or support means, either on the surface or in immersion.

The device according to the invention will produce the trajectography of the immersed moving body due to its own independent means that enable it to permanently calculate the absolute geographic position of said moving body. The determined trajectory can then be superposed on a two or three dimensional map of the environment in which the moving body is moving.

In order to increase the precision of positioning by "homing", the device according to the invention can advantageously use temperature and salinity information to refine its acoustic propagation parameters.

BRIEF DESCRIPTION OF THE DRAWING

Other characteristics and advantages will appear after reading the following description accompanied by FIGS. 1 to 4 that represent.

DETAILED DESCRIPTION OF THE DRAWING

Figure 1:
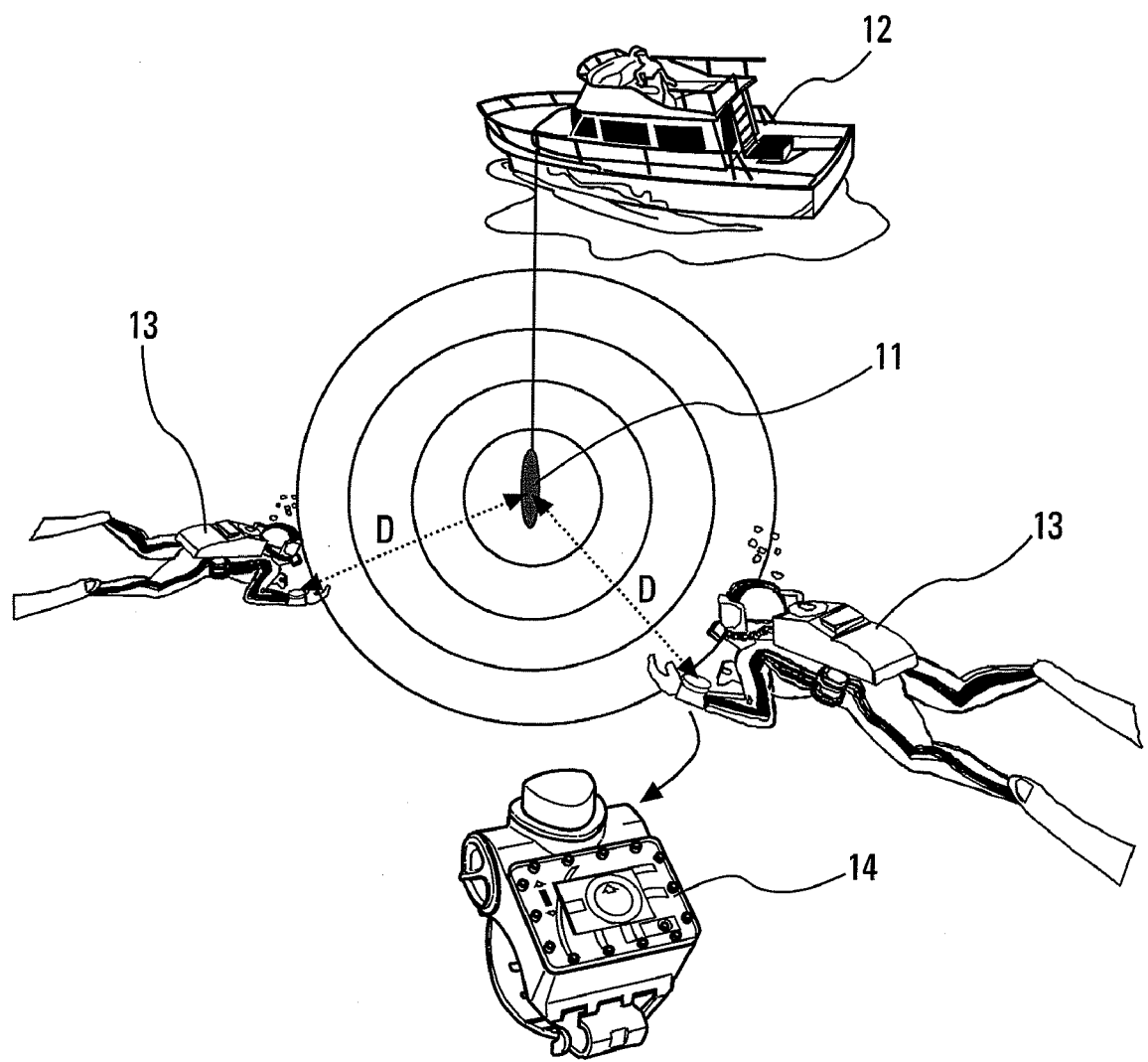
FIG. 1, an illustration of the principle of positioning by "homing"

As mentioned above, the "homing" process illustrated in FIG. 1 is frequently used by immersed moving bodies as a positioning method. This process enables immersed moving bodies to determine their position approximately with respect to a beacon 11 immersed at a fixed point and emitting a repetitive acoustic signal with a precise period. For example, this beacon may be located vertically below a boat 12 used for releasing divers 13. According to this method, the moving body is equipped with an acoustic receiver device 14 provided with a directive antenna that picks up signals from the beacon. The receiver also maintains an internal clock synchronized with periodic emissions from the beacon 11 so as to be able to calculate the distance separating it from said beacon by a measurement of the time for the signal to travel between the transmitter and the receiver. The moving body on which such equipment is installed can determine both the distance D separating it from the beacon 11 and the bearing θ between its velocity vector and the direction of the beacon. It is thus capable of returning to its start point at all times. This "homing" method has the advantage that it is easy to use and requires the use of relatively inexpensive equipment for the moving body. For example, this is particularly suitable for independent divers who wish to easily return to a start point, that in any case they cannot get too far away for autonomy reasons. On the other hand as mentioned above, this method has limited performances in terms of absolute geographic positioning. At a given moment, the calculated position information enables the moving body to know only that it is somewhere on the sphere centred on the beacon, at a radius equal to the measured distance D. This is why the term spherical ambiguity is used.

Figure 2:
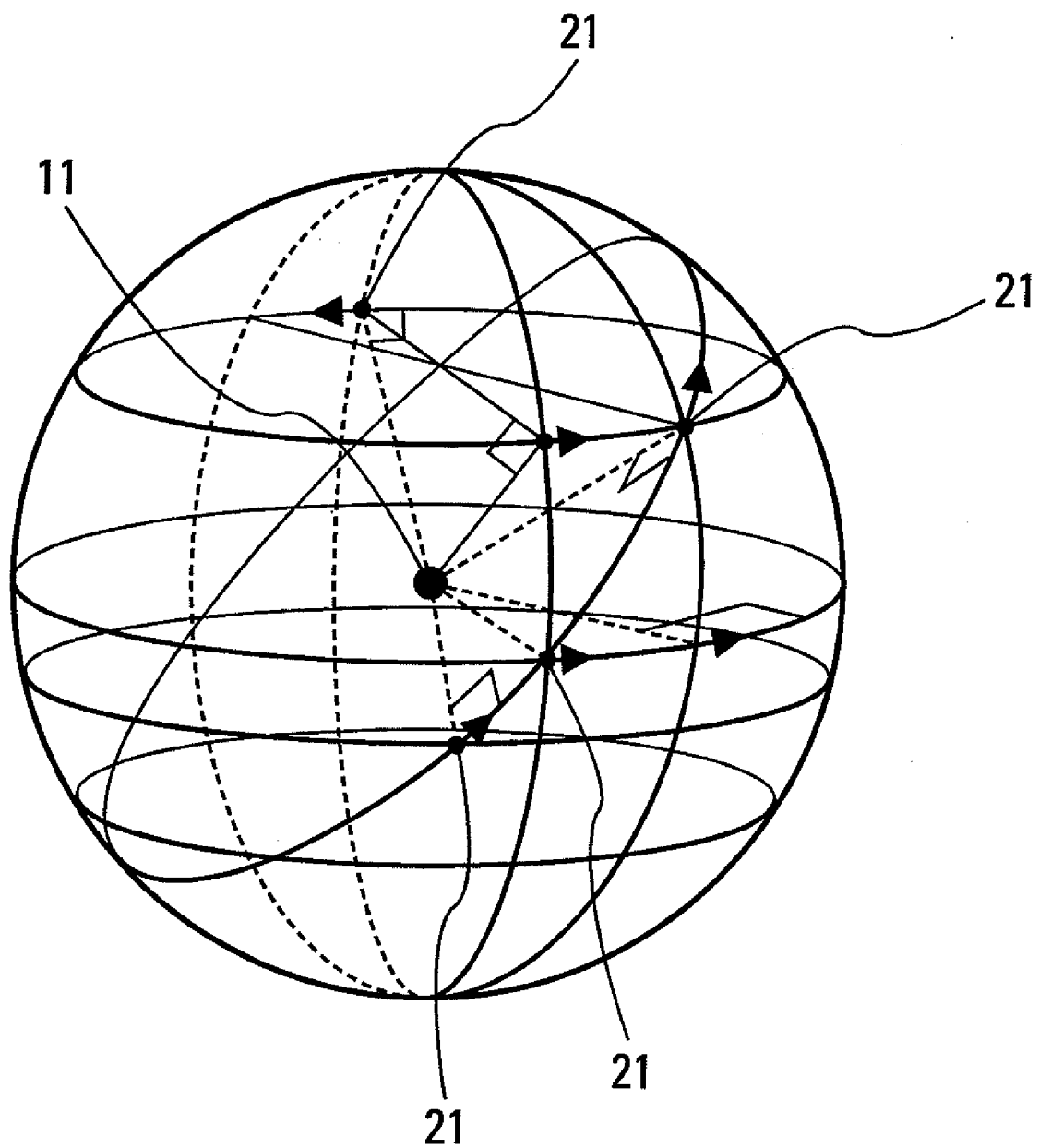
FIG. 2, an illustration of the spherical ambiguity inherent to positioning systems by "homing", FIG. 3, a principle block diagram presenting different elements of the device according to the invention, FIG. 4, an illustration of the calculation principle used by the device according to the invention, that a moving body can use to determine its absolute geographic position.

FIG. 2 illustrates this spherical ambiguity. This figure shows moving bodies 21 moving around circles with radius D centred on the beacon 11 as an example. It can be observed that the distance and bearing information on this figure are identical for all moving bodies shown, since the bearing is always equal to 90° and the distance is equal to D.

Therefore, this ambiguity means that devices based on the "homing" method are not very useful in cases in which the absolute geographic position of the moving body has to be known.

Figure 3:
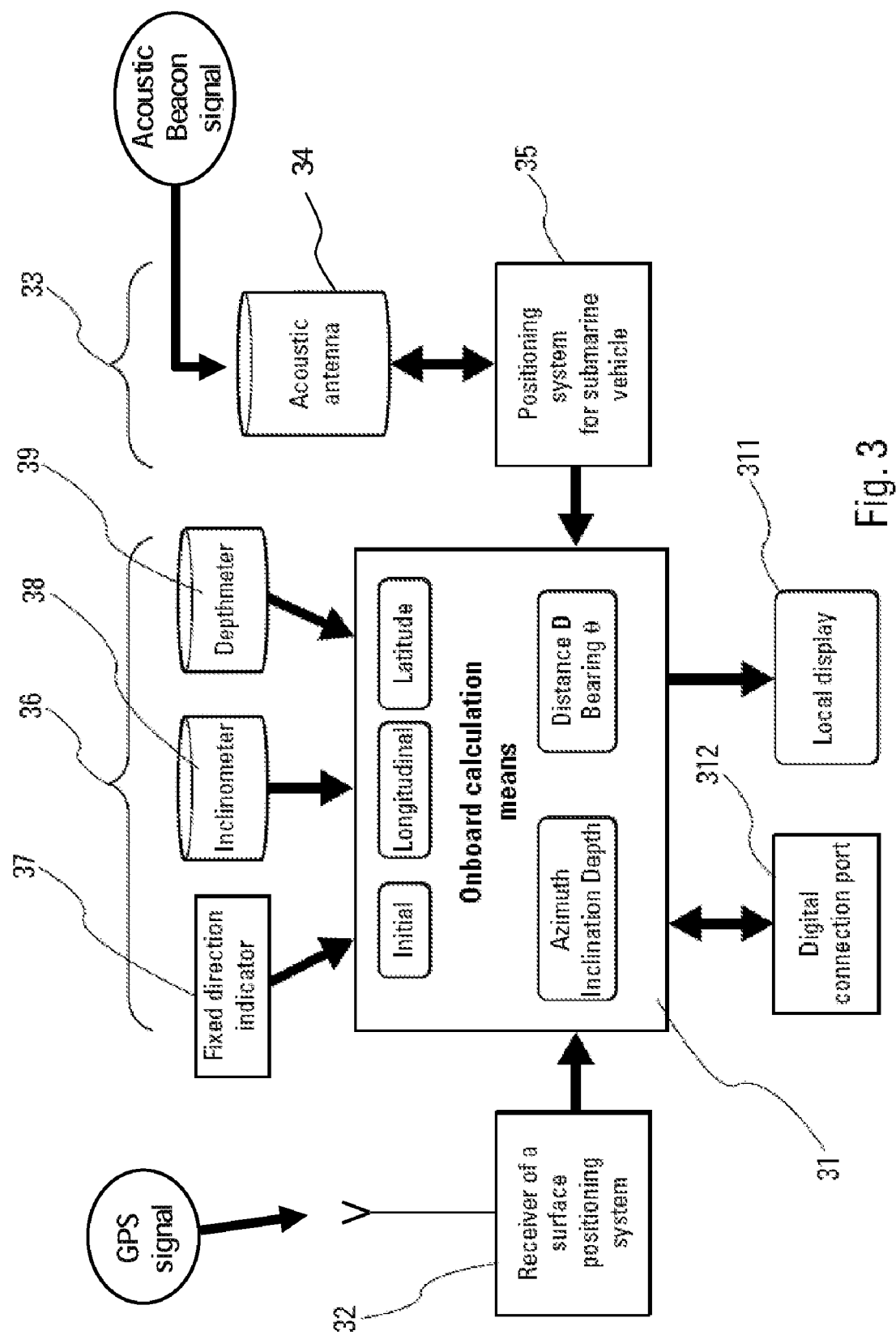

The block diagram in FIG. 3 illustrates the device according to the invention. This device associated with an emitting acoustic beacon eliminates the spherical ambiguity attached to devices according to prior art by a combination of means associated with onboard calculation means 31. In particular, it comprises the following to achieve this:

"Surface" positioning means 32 to determine the absolute coordinates (longitude, latitude and altitude) on the earth's surface, for example these means possibly consisting of a GPS or GALILEO receiver, "Homing" submarine positioning means 33 comprising in particular a directive acoustic antenna 34 associated with means 35 of determining the distance and the bearing at which the beacon is located, A set of sensors 36 to obtain the necessary information to eliminate the spherical ambiguity itself.

The calculation means 31 collect all information originating from means 32, 33 and 36 and use this information to determine the absolute geographic coordinates of the immersed moving body.

In one preferred embodiment, the assembly 36 specifically comprises three sensors:

A first sensor 37 consisting of a direction indicator fixed in space, for example a "2D fluxgate" type magnetic compass, mechanically fixed to the acoustic antenna 34 of the navigation system 33 and positioned in the same plane as this navigation system. In the horizontal position, this compass outputs the azimuth value between magnetic North and the velocity vector of the moving body to the onboard calculation means 31.

A second sensor consists of an inclinometer 38 that in particular keeps the acoustic antenna 34 and the magnetic compass 37 in an approximately horizontal plane.

A third sensor consisting of a depthmeter 39, for example built around a pressure sensor, outputting the value of the immersion depth of the moving body to the onboard calculation means 31.

Depending on the chosen embodiment and the type of moving body to be equipped with the device according to the invention, the second sensor 38 may also perform other functions such as piloting of a mechanical device that is designed to automatically keep the acoustic antenna and the magnetic compass in an approximately horizontal plane. For example, if the moving body is a diver, the sensor 38 may consist of a single spirit level.

Thus, starting from information output by the different means 32, 33 and 36 and the absolute initial geographic coordinates determined at the time that the moving body enters the water, the onboard calculation means 31 are capable of determining the absolute geographic coordinates of the displaced moving body at any time.

Figure 4:
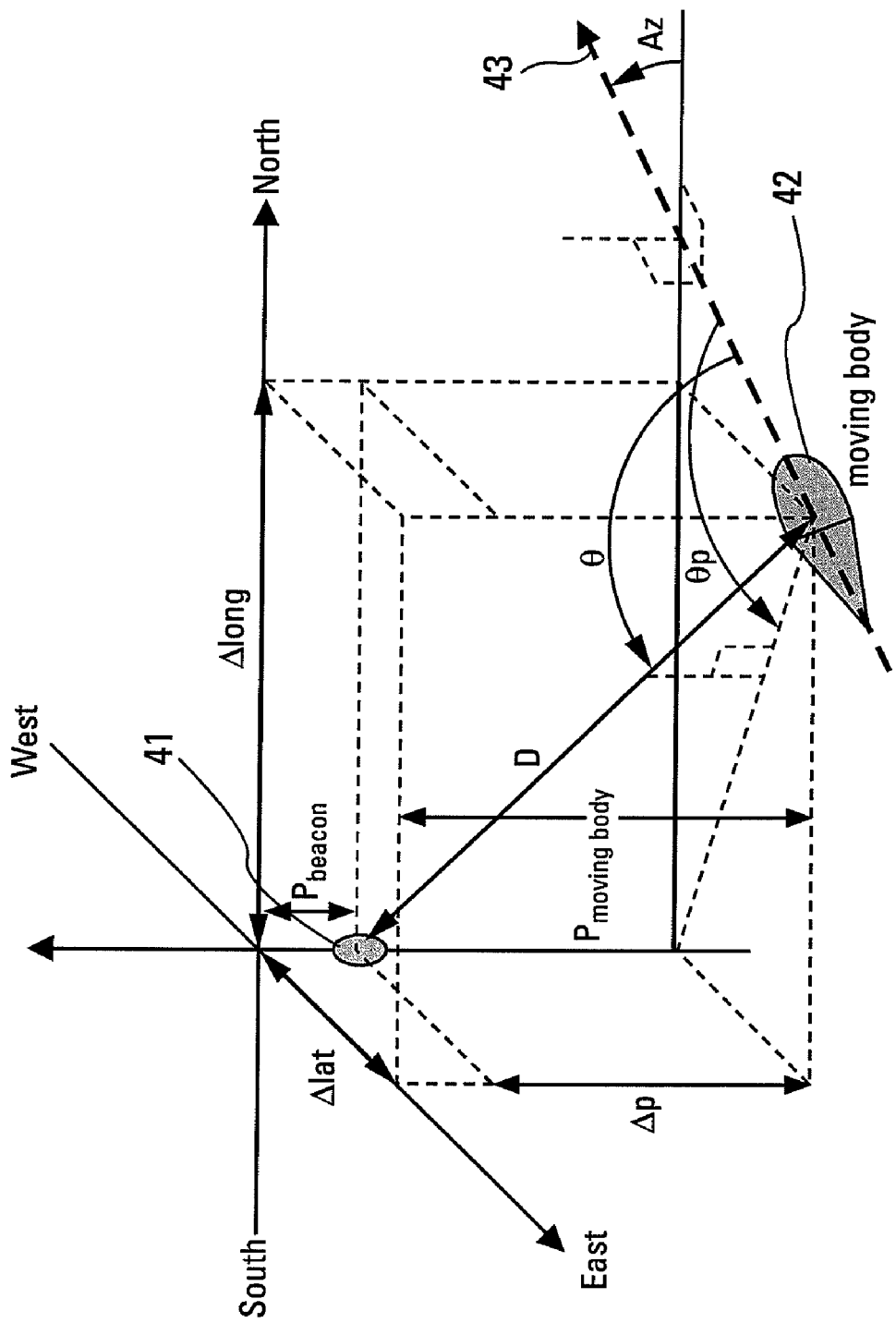

FIG. 4 illustrates the principle of the calculation made by the device according to the invention to determine and update the coordinates of an immersed moving body. These coordinates are given by the following formulas:

$$\Delta Lat. = (60/1852) \cdot [D \cdot \cos Az \cdot \cos \theta - \sin Az \cdot \sqrt{(D^2 \cdot \sin^2 \theta - \Delta p^2)}] \quad [1]$$

$$\Delta long. = (60/1852) \cdot [\cos Az \cdot \sqrt{(D^2 \cdot \sin^2 \theta - \Delta p^2)} + D \cdot \sin Az \cdot \cos \theta] \quad [2]$$

In relations [1] and [2], $\Delta$long. and $\Delta$lat. respectively represent the variation of the latitude and longitude during displacement of the moving body expressed in seconds.

$\theta$ represents the bearing angle of the acoustic beacon as determined by the navigation system 33, the acoustic antenna 34 being kept in a horizontal plane due to the inclination sensor 38.

Az represents the value of the azimuth given by the fixed direction indicator 37, this sensor normally being held in a horizontal plane.

$\Delta p$ represents the difference in immersion depth between the moving body 42 and the beacon 41, determined from information provided by the depthmeter 39.

D represents the distance from the beacon 41 to the moving body 42.

The expressions [1] and [2] are produced in a known manner from the following relations [3] and [4], providing expressions for $\Delta$lat. and $\Delta$long. in meters:

$$\Delta lat. = \cos(180° - \theta_p - Az) \cdot \sqrt{(D^2 - \Delta_p^2)} \quad [3]$$

$$\Delta long. = \sin(180° - \theta_p - Az) \cdot \sqrt{(D^2 - \Delta_p^2)} \quad [4]$$

where $$\cos\theta_p = \cos\theta \cdot \frac{D}{\sqrt{D^2 - \Delta_p^2}} \text{ and}$$

$$\sin\theta_p = 1 - \cos^2\theta \cdot \frac{D^2}{\sqrt{D^2 - \Delta_p^2}}$$

$\theta_p$ represents the projection of the bearing $\theta$, given by the relative positioning system, in the horizontal plane.

The presence of the term Az corresponding to the azimuth followed by the moving body in expressions [1] to [4], in other words the angular difference between the displacement direction and the North direction, advantageously provides an absolutely unambiguous manner of determining the magnitudes $\Delta$lat. and $\Delta$long. Knowing $\Delta$lat. and $\Delta$long, it is then possible to unambiguously determine the absolute coordinates of the moving body at any time, based on the initial geographic coordinates $lat_{ini}$ and $long_{ini}$.

The absolute geographic coordinates thus calculated can be displayed locally at the device on a display 311 and/or transmitted in digital form to a remote processing unit, through the communication port 312.

For example, the display 311 can simultaneously display the azimuth of the beacon, the distance from the beacon to the moving body and the absolute geographic coordinates (longitude, latitude and altitude) of the point at which the moving body is located at the instant considered.

As mentioned above, the device according to the invention is designed to operate with an acoustic beacon on which the "homing" positioning means 33 are synchronised. Moreover, the calculation of absolute coordinates makes it necessary for the device to be able to acquire absolute "surface" geographic coordinates using the receiver 32, at least at a given instant. Therefore, the device according to the invention is used by an immersed moving body following a determined operating method including several phases:

An immersion preparation phase,
A sensor initialisation phase,
An immersion operating phase,
A surface movement phase The preparation and initialisation phases are preliminary phases essential for operation in immersion. The immersion and surface movement operating phases may be alternated until the moving body finally rises to the surface.

During the preparation phase, the device according to the invention is started up and is put into "surface" operation in which it indicates the absolute geographic coordinates using only its "surface" positioning means 32. The information provided by the display 311 consists only of the longitude, latitude and altitude of the location at which the boat associated with the moving body is located. During this phase, the moving body may be either on the surface or on the release boat.

The initialisation phase consists mainly of synchronising acoustic navigation means 33 of the moving body 42 with the acoustic beacon 41. To achieve this, the acoustic emitter of the beacon 31 is switched on and the beacon is immersed under the boat, attached to one end or to the bottom of the anchor line. The immersion depth is usually a few meters, for example five meters. The moving body, for example a diver, is immersed into the water in order to synchronise the receiver of the "homing" positioning means 32 with the acoustic emitter of the beacon 41. This immersion is immediately detected by the device due to the sudden variation of indications of its depthmeter 39, and automatically triggers the synchronisation sequence.

The moving body homes to the position of the beacon 41 so that the acoustic receiver of its means 32 is brought close to said beacon, typically within one meter. The coherent and periodic acoustic signal emitted by the beacon 41 is thus quickly detected by the device according to the invention due to its own strong level, and the device then makes its synchronisation.

While synchronisation is being done, the initialisation phase comprises memorisation of the absolute geographic position of the beacon as the origin point. This position corresponds practically to the most recent geographic "surface" coordinates recorded by the means 32 of the device before the moving body is immersed.

At this stage, the device is entirely initialised and operational.

When initialisation is complete, the immersed operating phase can be initiated. The moving body can then move about freely. The device according to the invention uses different sensors to calculate the absolute geographic position of the moving body at any time. The calculation is made as described above. The current position of the moving body is given by the initial memorised position and the $\Delta$long. and $\Delta$lat. values calculated using formulas [3] and [4].

When the moving body needs to emerge temporarily or permanently along its path and to move on the surface, the device according to the invention may once again use its "surface" positioning means 32 (GPS or GALILEO) to acquire its position and compare the new "surface" coordinates acquired with the absolute coordinates calculated during immersion. The check enables the device to automatically reset the coordinates calculated before immersion again, if the difference is to high. The "homing" means 33 are kept in operation for a certain time during the emerged phase, so as to keep them synchronised with the beacon and to enable a new immersion if required.

The invention claimed is:

1. A device for independent determination of absolute geographic coordinates for an immersed moving body carrying the device, said device comprising:

acoustic means for positioning the moving body, providing the relative position in distance and bearing from a fixed immersed acoustic beacon, said position in distance and bearing being defined from an acoustic signal transmitted by said fixed acoustic beacon;

surface positioning means used by the moving body to determine absolute geographic coordinates of the moving body when the moving body is at the surface;

a set of sensors that the moving body uses to determine its travel depth, horizontality, and the difference between a speed vector of the moving body and a fixed direction;

onboard calculation means gathering information given by all of the acoustic means, surface positioning means and sensors, to calculate changes to the latitude, longitude, and elevation with respect to an origin position for which absolute geographic coordinates are previously memorized;

said device being configured to operate according to the following different phases:

a preparation phase during which, as the carrying body is at the surface, the device acquires the absolute coordinates of the initial position of the carrying moving body, using only said surface positioning means, an initialization phase during which, as the carrying body is brought close to the beacon, the said acoustic positioning means of the device are synchronized with the acoustic transmission signal of the beacon, an operating immersion phase during which, as the carrying body is in immersion, the onboard calculation means determine changes to the geographic position of the moving body with respect to an initial position of the moving body from the measurements given by acoustic positioning means and from the set of sensors, an operating surface phase during which, as the carrying body is at the surface, the device makes a new acquisition of the absolute geographic coordinates of the carrying moving body and, if necessary, updates the absolute position previously calculated during the immersion.

2. The device according to claim 1, wherein said acoustic positioning means comprise a directive antenna and a receiver synchronised on the acoustic signal transmitted by said fixed acoustic beacon, these means supplying calculation means with the distance D separating the moving body from the beacon and the bearing θ of the beacon from the velocity vector of the moving device.

3. The device according to claim 2, wherein said surface positioning means use a satellite positioning system to determine the longitude, latitude and elevation of the moving body when said moving body is emerged.

4. The device according to claim 1, wherein said set of sensors comprises at least one fixed direction indicator of the magnetic compass type, an inclinometer and a pressure sensor.

5. The device according to claim 3, wherein said set of sensors comprises at least one fixed direction indicator of the magnetic compass type, an inclinometer and a pressure sensor.

6. The device according claim 4, wherein said onboard calculation means further comprise a local display and an external communication port.

7. The device according claim 5, wherein said onboard calculation means further comprise a local display and an external communication port.

8. The device according to claim 1, wherein the acoustic means for positioning the moving body are of the homing type.

9. The device according to claim 2, wherein the acoustic means for positioning the moving body are of the homing type.

10. The device according to claim 3, wherein the acoustic means for positioning the moving body are of the homing type.

* * * * *